May 15, 1956 L. J. BOBB 2,745,904

MAGNETIC RECORDING MACHINE

Filed Feb. 28, 1948 5 Sheets-Sheet 1

Floyd J Bobb INVENTOR.

BY Synnestvedt & Lechner ATTORNEYS.

May 15, 1956 L. J. BOBB 2,745,904

MAGNETIC RECORDING MACHINE

Filed Feb. 28, 1948 5 Sheets-Sheet 2

INVENTOR.
Lloyd J. Bobb

Synnestvedt & Lechner
ATTORNEYS.

MAGNETIC RECORDING MACHINE

Filed Feb. 28, 1948 5 Sheets-Sheet 3

INVENTOR Lloyd J Bobb

ATTORNEYS Synnestvedt & Lechner

May 15, 1956 L. J. BOBB 2,745,904

MAGNETIC RECORDING MACHINE

Filed Feb. 28, 1948 5 Sheets-Sheet 4

INVENTOR.

Lloyd J. Bobb

BY

Synnestvedt & Lechner

ATTORNEYS.

May 15, 1956 L. J. BOBB 2,745,904

MAGNETIC RECORDING MACHINE

Filed Feb. 28, 1948 5 Sheets-Sheet 5

INVENTOR.
Floyd J. Bobb

Synnestvedt & Lechner
ATTORNEYS.

United States Patent Office 2,745,904
Patented May 15, 1956

2,745,904

MAGNETIC RECORDING MACHINE

Lloyd J. Bobb, Glenside, Pa., assignor to The International Electronics Company, Philadelphia, Pa., a corporation of Pennsylvania Application February 28, 1948, Serial No. 11,993

43 Claims. (Cl. 179—100.2)

This invention relates to sound recording and reproducing equipment and generally has to do with commercial dictating equipment.

The invention is particularly concerned with refinements both in operation and in production technique of the type of commercial dictating equipment disclosed and claimed in copending applications Serial Numbers 717,754, now Patent No. 2,672,346, issued March 16, 1954, 740,653, now Patent No. 2,653,819, issued September 29, 1953, 743,806, now Patent No. 2,530,029, issued November 14, 1950, and 743,807, now abandoned, all of which applications are assigned to the assignee of the present application. The type of dictating machine disclosed in those applications includes a rotatable mandrel for supporting a removable record sheet, a carriage adapted to support recording, reproducing and erasing means in contact with a record on the mandrel, mechanism for rotating the mandrel, mechanism for propelling the carriage both in a normal scanning sense and in a back spacing sense, an amplifier adapted to be interposed between an external transducer and the recording and reproducing means, controls for the scanning mechanism, and controls for the amplifier.

A general object of the invention is to improve the operating characteristics of office dictating equipment.

Another object of the invention is to simplify the operation of office dictating equipment.

A further object of the invention is to prevent the inadvertent erasing or redictation of a previously recorded message.

Yet another object of the invention is to provide control interlocks whereby back spacing of the dictating machine carriage automatically prevents inadvertent erasing or redictating of a previously recorded message, and preferably also conditions the equipment for reproducing.

Another object of the invention is to reduce the number of controls which must be manipulated in the operation of the machine, and more specifically, the invention contemplates the use of one control element both for effecting back spacing of the carriage and for conditioning the equipment for reproducing.

The invention also contemplates a dictating machine in which the carriage may be back spaced alternatively by a plurality of controls, and mechanism for conditioning the apparatus for reproducing responsive to any back spacing movement of the carriage.

In addition, the dictating machine of the invention includes manual means for restoring the apparatus to dictating condition after an automatic shift to reproducing condition consequent to a back spacing operation.

Still further, the invention contemplates mechanism for rendering operative the said manual means immediately upon the completion of a back spacing sequence.

Another object of the invention is to differentially indicate the recording and reproducing conditions of the apparatus.

A still further object of the invention is to coordinate said indicating means with both the manual and automatic condition controlling mechanism.

Beyond the foregoing, the invention contemplates a novel switch adapted to be actuated in response to a back spacing movement of the carriage for controlling the automatic conditioning mechanism of the apparatus.

In addition, the invention has as an object the restoring of the direction responsive switch to operative condition immediately after closing thereof.

A further object of the invention is to simplify the assembly of office dictating machines.

Yet another object of the invention is the assembly of an office dictation machine from a small number of completed sub-assemblies.

How the foregoing and other objects are attained will be more clearly understood upon reference to the description hereinbelow and the drawings, in which.

Figure 3:
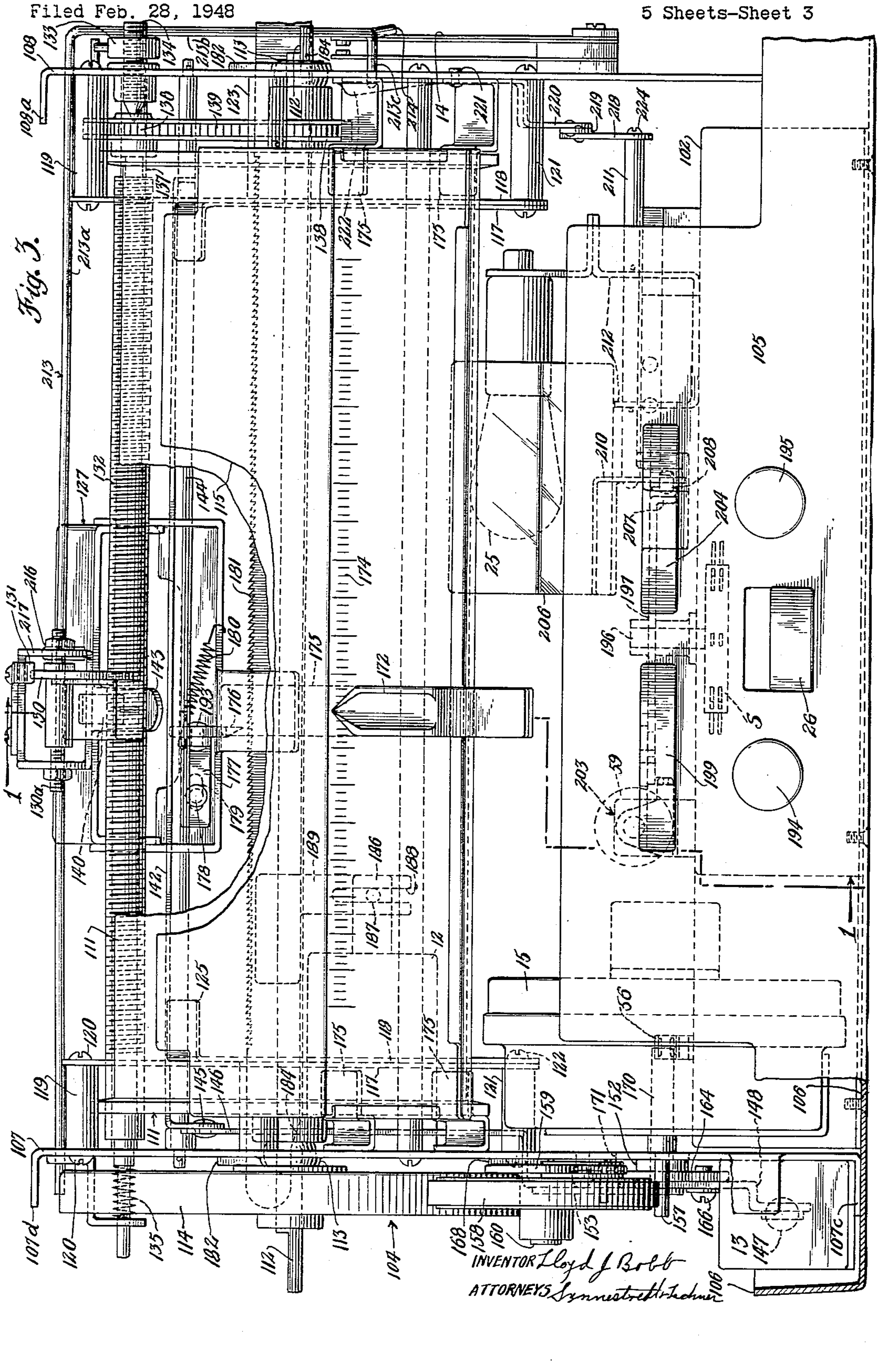
Figure 3 is a front elevation of the machine of Figure 2, also with certain parts broken out.
Figure 4:
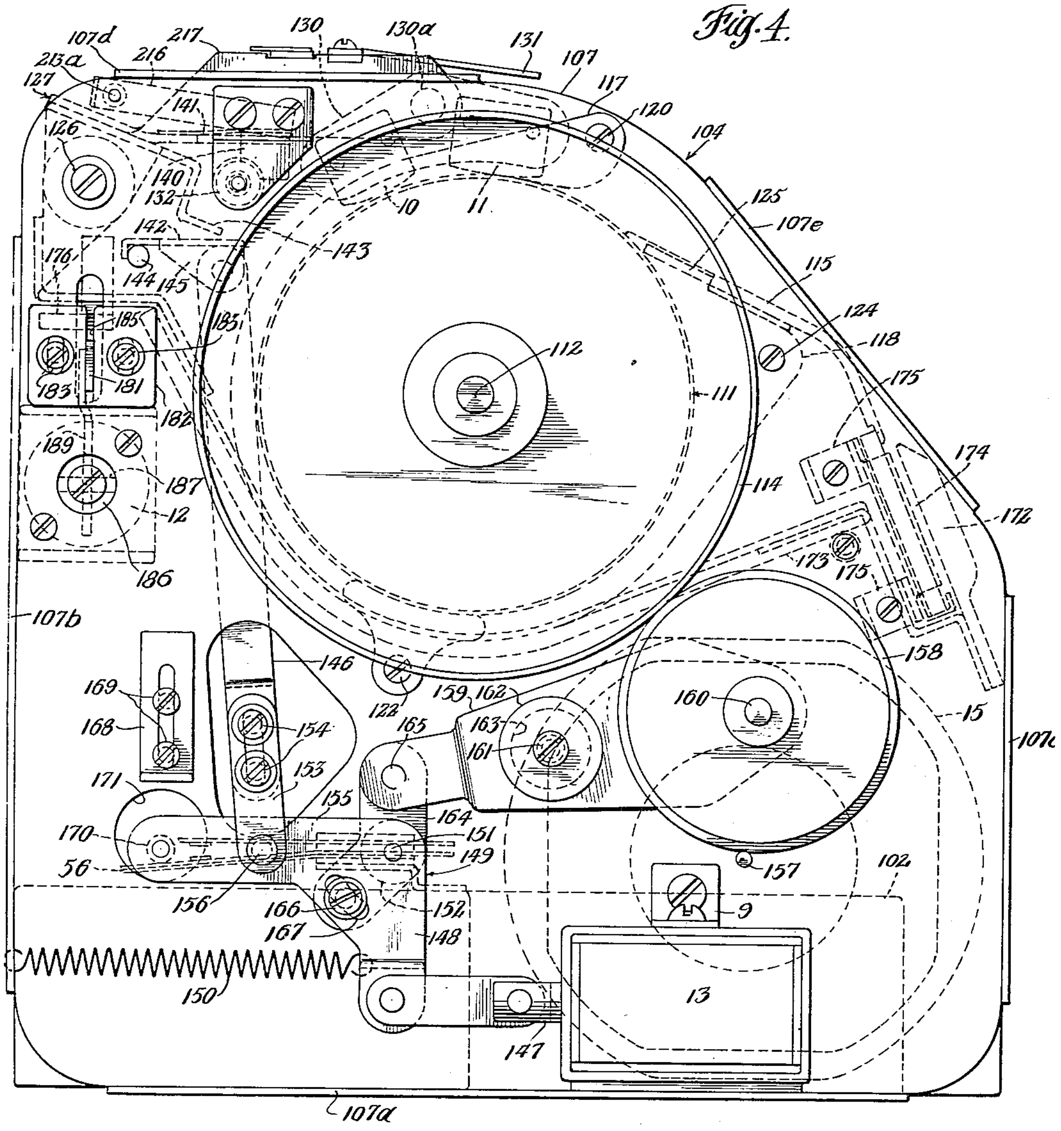
Figure 4 is an elevation of the left end of the machine as seen in Figures 2 and 3.
Figure 5:
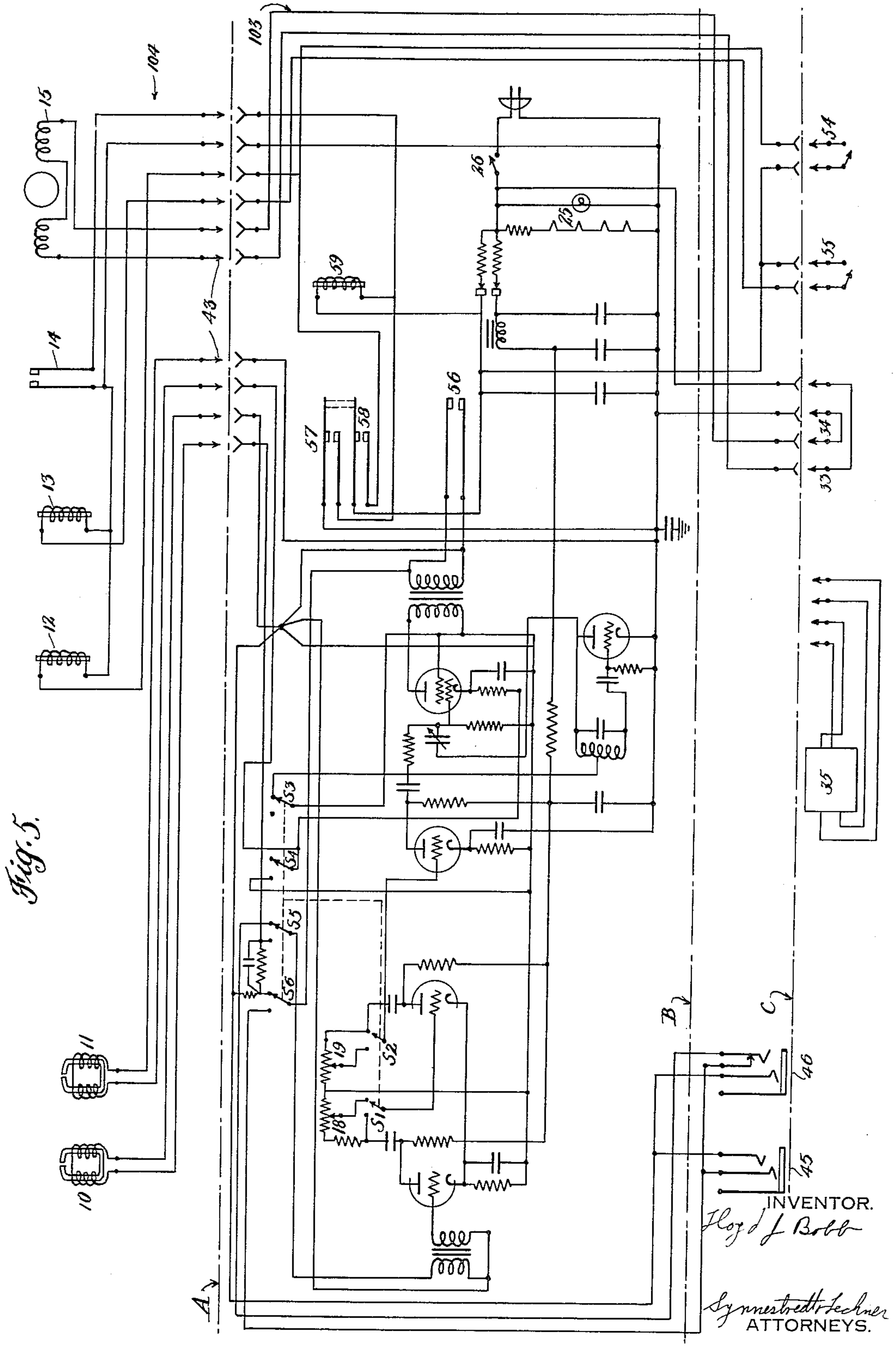
Figure 5 is a schematic diagram of the electronic and control circuits of the machine.

In connection with the drawings it is pointed out that Figures 1 through 4 are full scale drawings of a commercial dictating machine embodying the invention and especially adapted to mass production; that Figure 5 is a duplicate of the figure forming a part of my copending application Serial No. 787,645, now Patent No. 2,600,046, issued June 10, 1952 in which I have fully described and claimed the electronic circuits of the dictating machine disclosed herein, and that in the description which follows, and in the figures, the reference numbers applied to components appearing in Figure 5 correspond to the numbers applied to the same components in the said copending application.

The dictating machine described in detail hereinbelow and illustrated in the drawings comprises five major components, namely, as may be seen in Figure 1, a cabinet 101, an electronic chassis 102 disposed in the lower portion of the cabinet 101, an amplifier 103 located mainly within the chassis (see Figure 5), a mechanical assembly generally indicated at 104 (see Figure 1) disposed above the chassis, and a control panel 105 accessible from the front of the machine and having thereon means for controlling both the electronic and mechanical elements of the machine.

Figure 1:
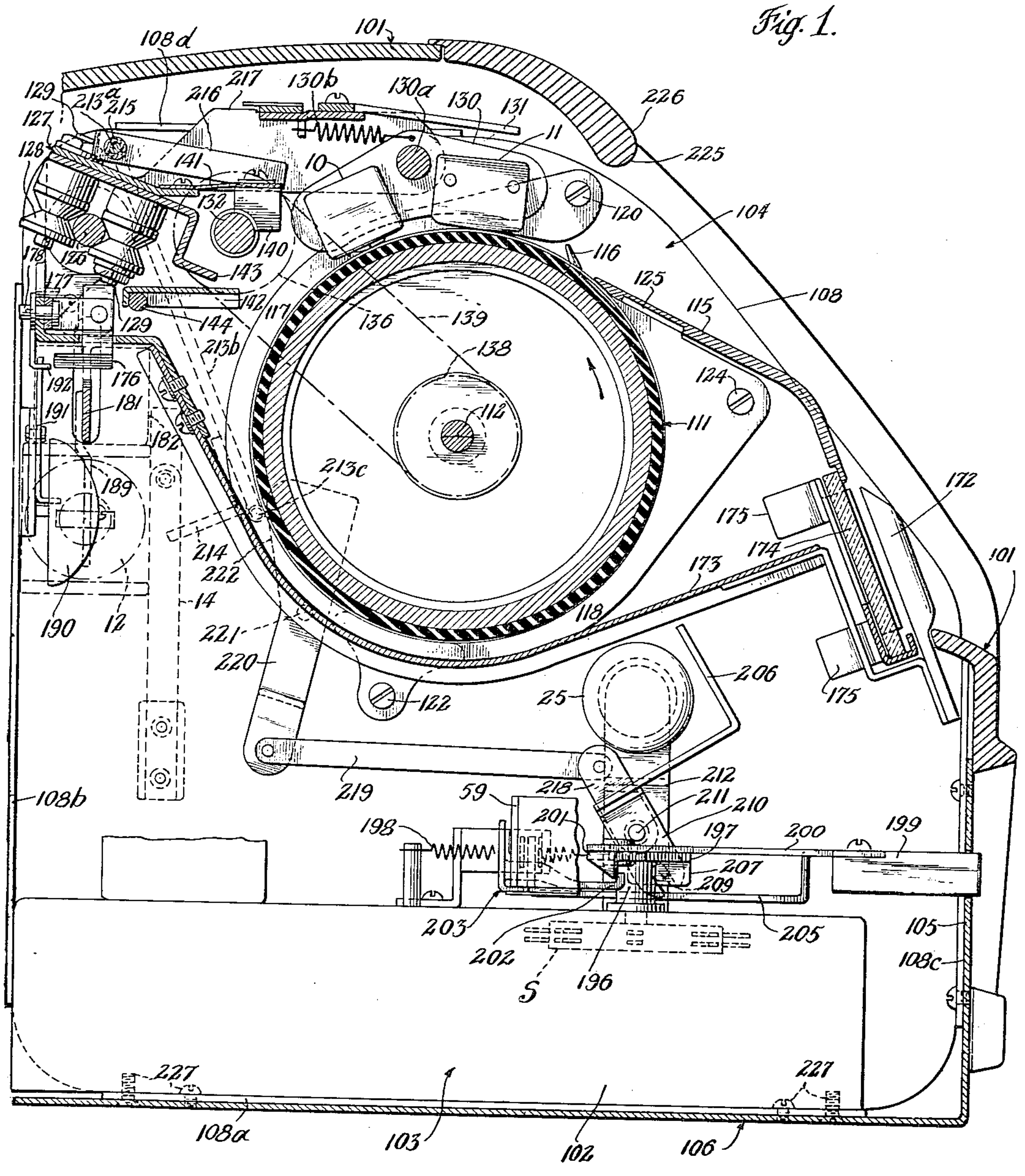
Figure 1 is a transverse sectional view of the complete dictating machine of the invention taken along the line 1—1 of Figures 2 and 3.

Turning now to Figure 1, it may be seen that the foundation upon which the machine is assembled consists of a rectangular metal box generally indicated at 106 whose front wall 105 comprises the control panel to which reference has already been made. Cabinet 101 engages the outside of the walls of box 106 and is secured thereto by screws, as indicated at 227.

Chassis member 102 (of conventional construction), which may comprise, for example, an inverted box or channel of conductive metal, occupies substantially the entire floor of box 106, and serves to house the major portion of the circuit elements of amplifier 103 and to support certain control mechanisms, as will appear.

The mechanical portion of the machine, which is adapted to be completed as a unitary structure before final assembly of the equipment, is largely supported by a pair of end plates 107 and 108. End plate 107, as may be seen in Figure 4, is stiffened by a bottom flange 107–*a*, a rear flange 107–*b*, a front flange 107–*c*, an upper flange 107–*d* and a flange 107–*e* along the inclined portion of the front edge of the plate. End plate 108 is similarly stiffened by flanges similarly designated, although the inclined flange on end plate 108 corresponding to flange 107–*e* is not disclosed in the drawings. As may most clearly be seen in Figure 3, flanges 107–*a* and 108–*a* are secured to the floor of box member 106 in any convenient manner, between the ends of the said box and chassis 102. In addition, the end plates 107 and 108 are adapted to be secured to the front wall or control panel 105 by means of tabs 107–*c* and 108–*c*, as is disclosed at 110 in Figure 2.

A record supporting mandrel, generally indicated at 111, is mounted on a shaft 112 which is journalled in bearings 113 supported by end plates 107 and 108. A drive wheel 114 is mounted upon shaft 112 to the left of end plate 107.

Mandrel 111 is adapted to support a flexible, rectangular record sheet carrying magnetizable material, as is more fully explained in the copending applications to which reference was first above made. As is there explained, a record sheet is loaded on the mandrel 111 by sliding it edge-first along a stripper plate 115 (see Figure 1) tangentially to mandrel 111 to a line contact with the surface thereof, concurrently with rotation of the mandrel which may be effected by means of a handle connected with shaft 112 and located outside cabinet 101. The mandrel and sheet are adapted for driving engagement with one another, as, for example, by means of a pair of holes in the leading edge of the sheet adapted to be penetrated by a pair of hooks 116. Upon engagement of the sheet and the mandrel surface, the rotation of the mandrel is continued until the sheet is tangent to the surface of the mandrel and the trailing edge overlaps the leading edge.

The sheet is maintained in contact with the surface of the mandrel by a pair of stationary guides, each of which comprises a plate 117 and a plate 118. Plates 117 and 118 are stamped or otherwise formed from sheet material, and have a concave edge surface closely approximating the contour of mandrel 111. Plate 117 is supported at its upper end by a post 119, which is secured to end plate 107 and to guide plate 117 by screws 120. The lower end of plate 117 is similarly supported by a post 121 and screws 122. Plate 118 is similarly supported at its upper end by post 123 and screws 124. The lower end of plate 118 overlaps the lower end of plate 117 and is supported by the same post 121 and screws 122. An ear 125 for supporting stripper plate 115 is formed on each of plates 118.

It will be understood that the two paper guides, each of which comprises a plate 117 and a plate 118, are similar to one another and are disposed near the ends of the mandrel 111; that each of hooks 116 is disposed in the area between a paper guide and the adjacent end of the mandrel; and that the scanned area of the record lies between the two paper guides.

Turning now to the carriage assembly and its drive mechanism, it should first be noted that a fixed rod 126 extends axially between end plates 107 and 108. Rod 126 provides an axial way for supporting the carriage structure generally indicated at 127. As may be seen in Figure 1, carriage 127 is mounted for travel on rod 126 by means of two opposed pairs of V-surfaced rollers 128, rotatably mounted on carriage 127 by means of threaded pins 129. The carriage is thus able to ride axially on rod 126 and also to oscillate with rod 126 as an axis.

An equalizer arm 130 is mounted for oscillatory movement on carriage 127 by means of a pin 130–*a*. In order to compensate for the tendency of the equalizer assembly to be rotated about pin 130–*a* by the friction between the rotating mandrel 111 and the head 11, the equalizer 130 is mounted in a manner to divide the pressure on heads 10 and 11 unequally, that is, by increasing the pressure on recording head 10, for example, by spacing the heads unequally from pin 130–*a*, or, as is shown in the figure, by the employment of a biasing spring 130–*b*. In this manner, the tendency of the erasing head to dig into the mandrel surface or to chatter thereon is eliminated. A stop member 131 limits counterclockwise oscillation of equalizer 130 when the carriage is rocked back.

Further details of an equalized head mounting may be found in copending application Serial Number 743,806, now Patent No. 2,530,029, issued November 14, 1950 and in copending application Serial Number 12,023, filed February 28, 1948, and entitled Magnetic Recording Apparatus, which has been abandoned and replaced by U. S. application Serial No. 364,887, filed June 29, 1953 in which the carriage arrangement disclosed herein is more fully described and claimed.

The construction of heads 10 and 11 may take any suitable form, for example, that described and claimed in my copending application, Serial No. 777,677, now Patent No. 2,555,110, issued May 29, 1951.

Carriage 127 is adapted to be propelled in a normal scanning sense (from left to right as viewed in Figures 1 and 2) by a lead screw 132, which is rotatably mounted between adjustable bearings supported by end plates 107 and 108. As is explained more fully in copending application Serial No. 740,653, now Patent No. 2,653,819 the position of lead screw 132 may be adjusted axially by means of a knob 133 fixed to a threaded bearing member 134 in threaded engagement with a fixed nut 134–*a*, at the right-hand end of the machine as viewed in Figure 2. The mounting of the left end of lead screw 132 includes a spring 135 which urges the lead screw 132 toward bearing 134. A sprocket 136 on lead screw shaft 137 is drivably connected to a similar sprocket 138 on mandrel shaft 112 by a chain 139, and, accordingly, the rotation of lead screw 132 bears a constant relationship to the rotation of mandrel 111 and is controlled simultaneously therewith, as will appear more fully hereinbelow.

Lead screw 132 is adapted to drivably engage a half-nut 140 yieldingly mounted on carriage 127 by means of a resilient member 141. It will be seen that upon oscillatory motion of the carriage about the axis of rod 126, half-nut 140 will move toward and away from lead screw 132, concurrently with the motion of heads 10 and 11 toward and away from the surface of mandrel 111. Since the mass of the carriage is located generally forward of rod 126, heads 10 and 11 are gravitationally urged toward the surface of mandrel 111 and half-nut 140 is similarly urged toward lead screw 132.

However, during periods when a record is not being scanned by the heads, the carriage is maintained in a "rocked back" position, that is to say, with the heads 10 and 11 out of contact with a record on the mandrel and with half-nut 140 out of engagement with lead screw 132. The carriage is held in this position by a tilt bar 142 extending the full length of the scanning path of carriage 127 and adapted to engage a tab 143 extending from the carriage in a forward and downward direction. Tilt bar 142 is mounted for rocking motion with a rod 144, journalled in end plates 107 and 108. Vertical rocking force is applied to an ear 145 formed on tilt bar 142 and pivoted to a vertical push rod 146. Push rod 146 is connected at its lower extremity to the main scanning control mechanism, which will now be described in detail.

Turning now to Figure 4, a solenoid 13 will be seen to be mounted on the foot 107–*a* of end plate 107 and is secured to end plate 107 by an angle bracket 9. The armature 147 of solenoid 13 is connected with the lower leg 148 of a bell crank generally indicated at 149. A spring 150 interconnects leg 148 of bell crank 149 with back flange 107–*b* of end plate 107 in a manner to urge the said leg rearwardly against the pull of solenoid 13. Bell crank 149 is pivotally mounted on a pin 151, which is journalled in a pad 152 supported by end plate 107.

Push rod 146 is adjustably secured to an extension 153 by bolts 154. Extension 153 is pivotally secured to horizontal leg 155 by a pin 156.

The control linkage, as shown in Figure 4, is in the position occupied when solenoid 13 is energized. It will be seen that when the circuit to solenoid 13 is broken, spring 150 will draw leg 148 of bell crank 149 to the rear, raising horizontal leg 155 and push rod 146 to raise tilt bar 142 and thus to rock carriage 127 to the "rocked back" position.

Figure 4 also discloses the manner in which a drive train from shaft 157 of motor 15 to drive wheel 114 of mandrel shaft 112 is established. This drive train, in addition to shaft 157 and wheel 114, already mentioned, also includes a puck 158 mounted for rotation on a link 159 by a pin 160. Link 159 is secured to end plate 107 by a bolt 161 and washers 162, the bolt passing through an oversize hole 163 in link 159. A dog leg link 164, pivotally mounted on end plate 107 by pin 151, is also pivotally secured to link 159 by a pin 165 and adjustably secured to bell crank 149 by a bolt 166 passing through an arcuate slot 167 in bell crank 149. It will be seen, therefore, that upon energization of solenoid 13, puck 158 will be drawn into a position of engagement with shafts 157 and drive wheel 114, and thus will transmit torque to mandrel 111 and lead screw 132. When the circuit to solenoid 13 is broken, spring 150, acting through bell crank 149, and links 164 and 159, will force puck 158 out of engagement with wheel 114.

The movement of the control linkage is limited, when the solenoid is energized, by the wedging of puck 158 between shaft 157 and wheel 114. When solenoid 13 is deenergized, the limit of movement of the linkage is established by a slotted stop member 168 adjustably secured to end plate 107 by screws 169. A more complete description of the drive mechanism will be found in copending application Serial No. 24,827, entitled Drive Control Mechanism for Magnetic Recording Apparatus, filed May 3, 1948, and assigned to the assignee of the present invention, now Patent No. 2,698,183, issued December 28, 1954.

Finally, in connection with the scanning control linkage, it should be pointed out that an insulated switch actuating element 170, carried by the rear-most end of leg 155 of bell crank 149, extends through an aperture 171 in end plate 107 to engage a blade switch 56, which switch is connected across the output of amplifier 103, as will appear from Figure 5, and which is adapted to be closed when solenoid 13 is deenergized, thus silencing the output of the dictating machine when the scanning mechanism is inoperative.

It will be understood from the foregoing description that when the scanning mechanism is at rest, carriage 127 may be moved freely on rod 126. In addition to the drive through lead screw 132 and half-nut 140, there are two other methods by which the carriage may be shifted axially along rod 126. First, the carriage may be shifted in either direction by means of a pointer 172, which, as may be seen in Figure 1, is rigidly interconnected with carriage 127 by a strap 173. Pointer 172 is adapted to traverse a translucent or transparent scale 174 (see Figure 3) in cooperation with which it indicates the position of the heads 10 and 11 on a record supported by mandrel 111. Pointer 172 also provides a convenient means of shifting carriage 127 either in a normal scanning sense or in a back spacing sense along rod 126. It should be pointed out that by the arrangement of pointer 172 and strap 173, the point of application of pressure to pointer 172 lies on a diameter of rod 126 passing through the centers of the rollers 128. An axial force applied to carriage 127 from a remote point on diameters of 126 substantially displaced from the diameter just mentioned, would result in binding of the roller mounting on rod 126 and thus prevent smooth application of a shifting force.

It may be mentioned that scale 174 is supported by pairs of mounting brackets 175 which interconnect scale 174 with end plates 107 and 108.

In addition to the provision for manual shifting of the carriage just above mentioned, the apparatus disclosed herein includes electromechanical means for step-by-step back spacing of carriage 127 along rod 126 to provide for rescanning of a record or a portion of a record supported on mandrel 111. The back spacing mechanism includes a pawl 176, slidably mounted on carriage 127 by means of an angle bracket 177 (see Figure 2), which bracket is secured to carriage 127 with freedom for sliding movement axially thereof by means of a bolt 178 passing through an axial slot 179 in the carriage body. Pawl 176 is normally maintained in its extreme rightward position relative to carriage 127 by spring 180.

Directly below rod 126 may be seen a toothed rack 181 extending the full length of the machine and penetrating end plates 107 and 108. The ends of rack 181 are supported by vertically adjustable slotted wear plates 182, one of which is secured to the outside of each end plate by means of screws 183, as is clearly shown in Figure 4. As is revealed in Figure 3, each end of the bottom surface of rack 181 includes an inclined portion 184, which, when the rack is in the position shown in Figure 3, lies immediately to the right of the bottom of the slots 185 of wear plates 182. It will be seen, therefore, that leftward movement of rack 181 through slots 185 will be accompanied by a rising motion of rack 181 as the incline 184 progresses through slot 185. Rack 181 is resiliently urged to the right by a biasing device not shown.

Such leftward movement of rack 181 is effected by a solenoid 12 having an armature 186 carrying a pin 187, which pin is engaged by a slot 188 in a bracket 189 secured to rack 181. Each time solenoid 12 is energized, therefore, rack 181 will move to the left and concurrently shift upward to a point of engagement with pawl 176. As the leftward movement of the rack continues, pawl 176 will be shifted leftward relative to carriage 127 until the tension of spring 180 overcomes the inertia of the carriage, shifting the carriage to the left. The spring 180 serves two functions: first, it absorbs the shock incident to the relatively rapid contact between rack 181 and pawl 176, which would otherwise project carriage 127 a greater distance than is desired; and, second, the spring 180 is capable of absorbing the full stroke of rack 181 should the back spacing mechanism be operated when the carriage is in its position of furthest advance to the left, thus preventing damage to the equipment in such event. Further details of the arrangement and construction of the back spacing mechanism will be found in said application Serial Number 364,877.

Before concluding the description of this portion of the machine, reference should be made to the mechanism which warns of the approach of the end of a record, namely, the bell 190, trigger 191, and actuating arm 192 carried by carriage 127 in a position to engage trigger 191 near the limit of extreme rightward movement of carriage 127.

To sum up the mechanical elements so far described, it will be seen that the machine includes a mandrel for supporting a record during scanning, a carriage capable of movement axially of the mandrel in either direction, drive means for rotating the mandrel and for effecting translation of the carriage in a normal scanning sense, control mechanism for initiating and terminating the rotation of the mandrel and the translational feed of the carriage, means for manual adjustment of the carriage axially of the mandrel in either direction, means for back spacing the carriage axially of the mandrel and control means for the said back spacing means.

Reference should now be had to Figure 5, in which it will be seen that I have provided an external switch 55 for energizing solenoid 13. It will therefore be apparent that closing switch 55, which may be, for example, a foot switch or a push button switch, will engage the drive train to mandrel 111 and lead screw 132 and drop tilt bar 142, thus permitting the heads to engage a record on the mandrel and the half-nut 140 to engage the lead screw. At 54 in Figure 5 is disclosed a second switch controlling back spacing solenoid 12. Each time switch 54 is closed, therefore, the back spacing mechanism will go into operation to shift carriage 127 to the left by a predetermined distance.

Figure 5 also includes a schematic diagram of the circuit of amplifier 103, which is completely described in my copending application Serial No. 787,645, and in which may be seen dictating volume control 18, adapted to be adjusted by means of a knob 194 and reproducing volume control 19 adapted to be adjusted by means of knob 195, both of which knobs are mounted on control panel 105, as shown in Figure 3.

Figure 2:
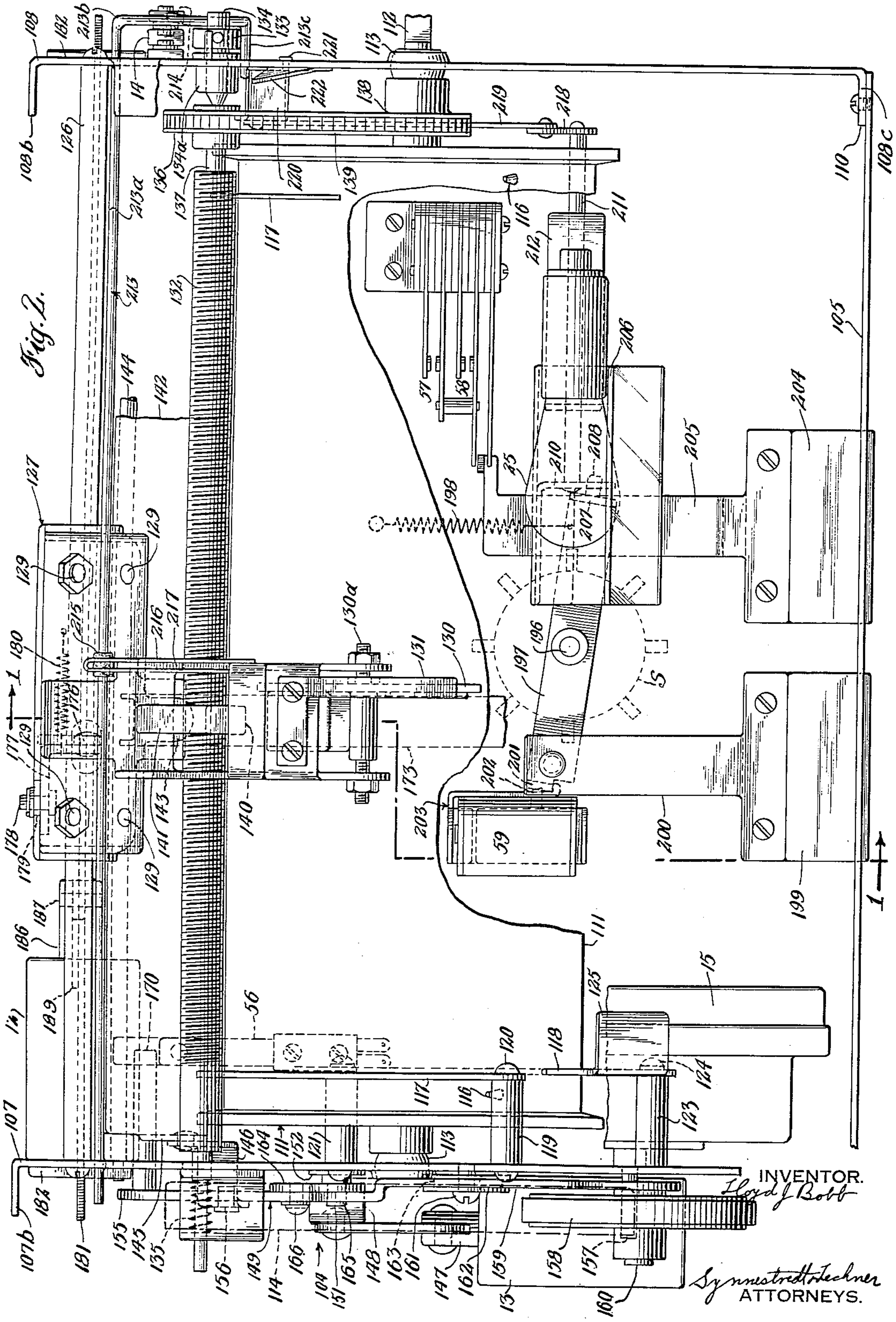
Figure 2 is a plan view of the machine of Figure 1 with the cabinet removed, and with certain portions broken away.

Figure 5 also discloses a 6-section switch S which is physically located, as may be seen in Figures 1, 2 and 3, within electronic chassis 102 but whose shaft 196 extends through an aperture into the area above chassis 102.

Switch sections S–1 and S–2 connect one or the other of dictating volume control 18 or reproducing volume control 19 into the amplifier circuit; switch sections S–5 and S–6 serve to connect the external transducer alternatively to the input and output of the amplifier; and switch sections S–3 and S–4, respectively, serve to energize the recording oscillator and the erasing head during recording and to disable the oscillator and erasing head during playback. During recording, therefore, recording volume control 18 is in the circuit, reproducing volume control 19 is inoperative, the oscillator and erasing head are energized, the external transducer is connected to the input of the amplifier, and the recording head is connected to the output of the amplifier. During reproducing, recording volume control 18 is out of the circuit, reproducing volume control 19 is in the circuit, the oscillator and erasing head are disabled, the recording-reproducing head is connected to the amplifier input, and the external transducer is connected to the amplifier output.

As may be seen in Figure 2, a beam 197 is secured to the upper end of shaft 196, which beam is biased toward the reproducing position of switch S by a spring 198. The opposite or left-hand end of beam 197 is interconnected with a push button 199 by a link 200. Push button 199 extends through front panel 105. As may be seen from Figure 2, rearward pressure on button 199 will shift beam 197 and switch S to the dictate position against the tension of spring 198. The beam 197 may be latched into dictate position by means of the interaction between a tooth 201 formed on beam 197 and a latch 202, which forms a portion of a standard electromagnetic latch assembly 203, which also comprises a solenoid 59. As may be seen most clearly in Figure 1, if the apparatus has been shifted into the dictating position by rearward pressure on button 199, energization of solenoid 59 will cause latch 202 to move downwardly, clearing tooth 201 and permitting spring 198 to restore beam 197, and hence switch S, to reproducing position. Manual control of the energization of solenoid 59 is effected by means of a switch 57 (see Figure 2), adapted to be closed upon rearward pressure on a second push button 204 through the intermediation of a link 205.

Switch 57 is ganged with a second switch 58, which latter, as may be seen upon reference to Figure 5, is connected in parallel with remote back space switch 54. Hence, pressure on push button 204 results in two effects. First, solenoid 59 is energized, releasing latch 202 and permitting the switch S to be drawn into the reproduce position by spring 198. Secondly, solenoid 12 is energized, resulting in a back spacing movement of carriage 127. It will be seen that repeated pressure upon button 204 will result in repeated back spacing movement of carriage 127, and, hence, it will be seen that the two push buttons 199 and 204 provide first for selective adjustment of the electronic circuits to either dictating or reproducing position, and, second, for effecting back spacing movement of carriage 127.

The beam 197 also actuates mechanism for indicating the condition of switch S. This indicating means includes a lamp 25 adapted to illuminate translucent or transparent scale 174 in either condition of adjustment of switch S and beam 197, and a translucent or transparent colored screen 206, which is adapted to be interposed between lamp 25 and scale 174 when the switch is in the dictating condition and thus to cause the scale to be illuminated by light of one color in the dictating condition and by light of another color in the reproducing position.

The mechanism by which screen 206 is shifted into and out of operative position will now be described. It will be seen that the right end of beam 197 is bent downwardly at right angles to form a tab 207, which tab carries a horizontal pin 208. Pin 208 engages a slot 209 formed in the lower end of a crank 210, which is secured to the end of a rod 211, which rod is journalled for oscillatory motion in a mounting bracket 212 which also supports lamp 25. A tab formed on link 210 supports screen 206, which, therefore, oscillates about rod 211 upon motion of beam 197 about shaft 196. As may be seen, therefore, screen 206 will be interposed between lamp 25 and scale 174 when the apparatus is in the dictating condition.

From what has already been said, it will be clear that the condition of switch S is controlled by push buttons 199 and 204; and that movement of carriage 127 may be controlled alternatively by the normal dictate-listen switch 55, by either of the two back space switches 54 and 58, and by manual adjustment of the carriage through the intermediation of pointer 172. Accordingly, it is possible to back space the carriage with the intention of "playing back" a previously dictated record, and inadvertently neglect to shift the equipment from dictating to reproducing condition, with the consequence that the previously recorded message will be erased upon initiation of the normal scanning movement of the carriage.

According to the invention, however, I eliminate this possibility by providing an interconnection between the scanning control mechanism and the amplifier control mechanism. This interconnection includes a switch mechanism which may be termed a "direction-sensitive switch," connected with solenoid 59 in a manner to release latch 202 and thus throw the machine into the reproducing condition whenever the carriage is back spaced in any manner.

The direction-responsive switch above referred to includes a switch-actuating rod 213, which passes through both end plates 107 and 108 in the area above and slightly forward of rod 126. Rod 213 is free for limited axial movement through the end plates above referred to and includes a major leg 213–*a*, an intermediate leg 213–*b*, disposed to the right of end plate 108 and extending downwardly and forwardly as may be seen in Figure 1, and a third short leg 213–*c* parallel to the major leg 213–*a* and extending a short distance through end plate 108.

Intermediate leg 213–*b* carries a switch actuating member 214 which lies in operative relationship to switch 14 in a position to close the same upon leftward movement of the major leg 213–*a*.

Major leg 213–*a* passes through a fibrous sleeve 215 supported by a doubled thickness of sheet material 216 which slidingly engages a vertical portion 217 of the superstructure of carriage 127. By means of this sliding engagement with the carriage, the member 216 is secured as against movement relative to the carriage in a sense axially of the mandrel, but is free for movement in a forward and rearward sense to accommodate rocking movement of carriage 127 about rod 126.

The degree of frictional engagement between fibrous sleeve 215 and rod 126 is such that when the carriage is shifted to the left, rod 213 shifts with the carriage, closing switch 14. When the point of substantial solidification of switch 14 has been reached, sleeve 215 slides on rod 213 without appreciably interfering with the freedom of motion of the carriage. As will be clear from Figure 5, the closing of switch 14 will energize solenoid 59, releasing latch 202, and as a consequence, if the carriage is back spaced in any manner whatsoever, while the equipment is in dictating condition, switch S will automatically be thrown to the reprducing position and thus prevent inadvertent erasing of a previously recorded signal.

If the switch 14 should remain closed upon the completion of the back spacing operation, it would be impossible to restore the equipment to the dictating condition, and accordingly, I have provided for opening the switch 14 immediately upon the shifting of the apparatus to the reproducing condition. This is accomplished by means of linkage associated with rod 211, which, as is described above, oscillates as an incident to shifting the equipment from dictation to reproduction. Secured to the right end of rod 211, is a crank 218, pivoted to a cross link 219. Cross link 219 drives a second crank 220, pivoted to end plate 108 at 221. A cam surface 222 is developed on the upper end of crank 220 and is adapted, upon shifting of switch S into the reproducing condition, to push leg 213–c of switch rod 213 to the right, thus opening switch 14, deenergizing solenoid 59, and restoring latch 202 to a position wherein it may engage tooth 201. It will be seen, therefore, that a deliberate intent to erase or redictate a previously recorded portion of a record may be implemented by operation of push button 199 at any time subsequent to the completion of a back spacing operation.

The physical relationship of the major components of the dictating machine are such as to permit easy assembly on a large scale basis. For example, the electrical connections between amplifier 103 and mechanical assembly 104 are made by means of separable connectors of known type diagrammatically indicated at 43 in Figure 5. In Figure 5, the dotted line "A" represents the division between the mechanical assembly and the electronic chassis of the machine. The two units are mechanically interconnected only by their common mounting on box 106 and through the control linkage which restores switch 14 to operative position upon completion of a back spacing operation. In assembly, the linkage may be completed at any convenient point, as at screw 224. The unitary construction of amplifier 103 and mechanical assembly 104 is not only conducive to simple manufacturing assembly, but also enables either unit to be removed and replaced when servicing is required.

Turning now to the cabinet 101, it should be noted that, as may be seen in Figure 1, the upper edge 225 of the opening which provides access for occasional adjustment of a sheet on mandrel 111, is defined by a heavy member 226 extending substantially across the face of the machine.

Member 226 is spaced sufficiently from mandrel 111 to receive the fingers of the hand and thus affords a handle by which the machine may be lifted and transported.

Cabinet 101, amplifier 103, and mechanical assembly 104, are secured to box 106 by means of removable fastening devices 227 of conventional type.

As is more fully set forth in my copending application Serial No. 787,645, the dictating machine of the invention is adapted to be used in conjunction with one or more external transducers which are connected to the dictating machine by jacks 45 and 46 (see Figure 5). I have also described in the said copending application the manner in which an inverter 35 may be inserted into certain of the circuits by removing the jumpers 33 and 34 and replacing them with the leads to the inverter. Remote switches 54 and 55, together with the elements just above mentioned, are adapted to be connected to the dicating machine of the invention through a terminal block bounded in Figure 5 by the dotted lines B and C.

In all of the foregoing description, and in the drawings, I have illustrated a complete recording and reproducing machine. It should be understood, however, that certain aspects of the invention are applicable to a simplified form of machine adapted for transcription of messages recorded by a complete machine. Such a transcribing machine may be assembled from the same basic components as the dictating machine above described, but with the omission of certain elements, as, for example, the erasing head, the dictating button, the dictating-listen switch, the condition indicating mechanism, the recording oscillator, and the recording volume control.

From the foregoing, it will be seen that the dictating machine of the invention may be operated by the manipulation of a minimum number of controls, and that control of the amplifier condition and scanning mechanism are coordinated in a manner to minimize inadvertent erasure or redictation of previously recorded dictation.

It will also be apparent that the dictating machine of the invention is well adapted to mass production by virtue of the simplicity of its component parts and the ease with which the components may be combined into units prior to final assembly. As a primary example, it may be pointed out that both the entire mechanical assembly and the entire amplifier unit may be separately assembled and finally adjusted before being brought together.

I claim:

1. Office dictation equipment comprising a mandrel for supporting a magnetic record, a carriage mounted for normal scanning movement and for back spacing movement relative to a record on the mandrel, a scanning electromagnet carried by the carriage, a circuit for said electromagnet, a switch for controlling said circuit and means interconnecting said carriage and said switch and driven by the carriage upon back space movement thereof to operate the switch.

2. A construction in accordance with claim 1 in which said electromagnet is an erasing head.

3. A construction in accordance with claim 1 in which said electromagnet is a recording-reproducing head 4. Office dictation equipment comprising a record-reproducing carriage mounted for normal scanning movement and for back spacing movement, a shiftable control for alternatively conditioning the equipment for recording and for reproducing, and mechanism driven by said carriage in back spacing movement thereof for shifting said control to condition the equipment for reproducing.

5. Office dictation equipment comprising a recording-reproducing carriage mounted for movement alternatively in a normal scanning sense and in a back spacing sense, a manually operable switch for conditioning the apparatus alternatively for recording and reproducing, a biasing device urging the switch toward the reproducing position, a detent for maintaining the switch in the recording position, and mechanism driven by said carriage in back spacing movement for releasing said detent.

6. Apparatus adapted for sound reproduction and for recording, comprising a carriage mounted for normal scanning and for back spacing, transducer means alternatively adaptable for reproducing and for recording, and a switch having actuating mechanism driven by back spacing movement of the carriage to condition the transducer means for reproducing.

7. A construction in accordance with claim 6 in which said switch is manually operable to condition the transducer for reproducing.

8. A construction in accordance with claim 7 and further including manually operable control mechanism for effecting back spacing of said carriage.

9. A construction in accordance with claim 8 and further including a second switch responsive to operation of said manually operable control mechanism for controlling said first switch.

10. Office dictation equipment comprising a recording-reproducing carriage mounted for normal scanning movement and for back spacing movement, a switch for alternatively conditioning the equipment for recording and for reproducing, a biasing device urging the switch toward the reproducing position, a detent for maintaining the switch in the recording position, a solenoid for releasing said detent, and a second switch for controlling said solenoid and adapted to be closed upon back spacing movement of said carriage.

11. A construction in accordance with claim 10 and further including a manual control for energizing said solenoid.

12. Office dictation equipment including back spacing mechanism controlled by the manual control recited in claim 11.

13. A connstruction in accordance with claim 12 and further including a separate control for said back spacing mechanism.

14. A construction in accordance with claim 10 and further including mechanism for disabling said second switch during the shifting of said first switch into reproducing position.

15. A construction in accordance with claim 14 and further including mechanism for restoring said second switch when the first switch is operated to the recording position.

16. A construction in accordance with claim 10 and further including a manual control for shifting said first switch to the recording position.

17. In recording-reproducing apparatus, a carriage mounted for normal scanning movement and for back space movement, a record-reproduce switch, an operating member for said switch, a bias device urging said member to the reproduce position, a detent adapted to maintain said member in the record position, mechanism for releasing said detent driven by the carriage in back space movement, mechanism for restoring said releasing mechanism actuated by said member upon movement thereof to the record position, and a signal device actuable by said member to indicate the condition of said switch.

18. A construction in accordance with claim 17 in which said signal device comprises a lamp and a movable colored light transmitting body adapted to be selectively associated and dissociated with said lamp upon movement of said member.

19. Office dictating equipment comprising scanning mechanism including a carriage, a light transmitting scale, a pointer adapted to cooperate with the scale to indicate the position of the carriage, a source of light adapted to illuminate the scale, a shiftable control element adapted to selectively condition the equipment for dictation and for reproducing upon shifting thereof, and a colored light transmitting screen associated with said control element and adapted to be interposed between said light source and said scale in one position of adjustment of said control element.

20. Recording and reproducing apparatus comprising a carriage carrying a transducer, mechanism for driving said carriage in a normal scanning sense and in a back spacing sense, a switch operating mechanism therefor, a member on said carriage for driving said operating mechanism upon a change in the direction of movement of said carriage, a circuit for said transducer and a control for said circuit responsive to operation of said switch.

21. Recording and reproducing apparatus comprising a carriage mounted for normal scanning movement and for back-spacing movement relative to a record, a control device for alternatively conditioning the apparatus for recording and for reproducing, and mechanism for actuating said control device comprising a member mounted for limited movement in a path generally parallel to the path of movement of the carriage, a second member carried by the carriage, and means connecting the second member with the first member in a manner to transmit forces sufficient to actuate said control device and insufficient to move the carriage.

22. Recording and reproducing apparatus comprising a carriage mounted for normal scanning and for back spacing, a switch actuating member mounted for limited movement in a path generally parallel to the path of movement of the carriage, and a second member carried by the carriage and cooperating with the first member in a manner to transmit forces sufficient to actuate the switch and insufficient to move the carriage, a control element for shifting the apparatus from recording to reproducing condition, and a switch actuated by said member for controlling said control element.

23. A construction in accordance with claim 22, in which said first member extends along substantially the entire length of the path of movement of the carriage.

24. A construction in accordance with claim 23 in which said first member comprises a rod and said second member comprises a sleeve encircling said rod.

25. A construction in accordance with claim 24 in which said sleeve embodies a frictional lining.

26. Recording-reproducing equipment comprising a record support, a carriage adapted to scan a record on said support in a normal scanning sense and in a back spacing sense, a 2-position shiftable element for shifting the equipment from recording condition to reproducing condition, a switch for controlling said element, an elongated actuating member for said switch extending along the path of movement of the carriage and mounted for limited axial movement, and a second member carried by the carriage and frictionally engaging said first member, with sufficient adhesion to transmit a force of switch-actuating magnitude and with less adhesion than that required to transmit a force of carriage-moving magnitude.

27. A construction in accordance with claim 26, and further including linkage associated with said shiftable element adapted to move said actuating member in the normal scanning direction upon shifting of said element into reproducing position.

28. An office dictation machine comprising a scanning unit, an electronic unit, a control panel, a control for the electronic unit comprising a member mounted for movement between two positions, corresponding respectively to recording and reproduction, said member penetrating an aperture through said control panel, latch means for maintaining said member in one of said positions, a second control member similar to the first for effecting back spacing operation of the scanning unit, resilient means urging said second member toward one of its positions, and means associated with said second member for releasing said latch upon movement of said second member.

29. An office dictation machine comprising scanning mechanism, an amplifier circuit, a control panel, a control member for said circuit reciprocable in an aperture in said panel between an extended position and a depressed position, each of said positions corresponding to a condition of said circuit, resilient means urging said member to the extended position, latch means for maintaining said member in the depressed position, a second control member in a second aperture in the panel reciprocable to a depressed position responsive to a shifting force, mechanism associated with said second member for initiating a scanning operation upon reciprocation of said second member to the depressed position, further mechanism associated with said second member for releasing said latch upon reciprocation of said second member to said depressed position and resilient means associated with second control member for restoring said second member to extended position upon removal of said shifting force.

30. Magnetic recording equipment comprising a record-reproducing head, controllable mechanism for translating a magnetic record relative to said head, a switch for alternatively conditioning the equipment for recording and reproducing, a biasing device urging the switch toward the reproducing condition, first means for maintaining the switch in the recording position, second means for releasing said first means, a device shiftable in one direction responsive to application of a shifting force to initiate operation of said mechanism and said second means and means associated with said device for shifting said device in the opposite direction upon removal of said force to terminate operation of said mechanism.

31. A construction in accordance with claim 30, and further including mechanism for disabling said second means during the shifting of said switch into reproducing position.

32. A construction in accordance with claim 31, and further including mechanism for restoring said second means to operative condition when said switch is operated to the recording position.

33. Magnetic recording and reproducing equipment comprising a record support and a recording-reproducing electromagnet mounted for relative movement in a normal scanning sense and in a backspacing sense, recording-reproducing circuit means connected with said electromagnet and including a switch for alternatively conditioning the circuit means for recording and for reproducing, mechanism for effecting relative movement of said record support and the electromagnet in the backspacing sense, a manual control connected with said switch and said backspace mechanism shiftable in one direction responsive to application of a shifting force to provide for concurrent backspace and switching of the circuit means from the recording to the reproducing condition, and resilient means for shifting said control in the opposite direction upon removal of said force to disengage said back space mechanism.

34. Magnetic recording and reproducing equipment comprising a record support and electromagnetic scanning means including a reproducing head and an erasing head, the record support and said electromagnetic scanning means being mounted for relative movement in a normal scanning sense and in a backspacing sense, a reproducing circuit associated with the reproducing head, an erasing circuit associated with the erasing head, a switch having contacts associated with both of said circuits and providing for alternative activation of the circuit for the reproducing head and the circuit for the erasing head, mechanism for effecting relative movement of said record support and of the electromagnetic scanning means in the backspacing sense, a manual control connected with said backspace mechanism and shiftable in one direction responsive to application of a shifting force to provide for concurrent backspace and switching to activate the circuit for the reproducing head and resilient means operative to shift said control in the opposite direction upon removal of said force to disengage the back space mechanism.

35. Magnetic recording equipment comprising a recording-reproducing head, controllably engageable and disengageable mechanism for translating a magnetic record relative to said head, a first control member operative in a first position to condition the equipment for recording and in a second position to condition the equipment for reproducing, said member being shiftable to one of said positions responsive to application of a shifting force, first resilient means operative to shift said first member to the other of said positions upon removal of said force, releasable means for maintaining said first control member in said one position, a second control member operative in a first position to engage said mechanism, and in a second position to disengage said mechanism, said member being shiftable to one of said positions responsive to application of a shifting force, second resilient means operative to shift said second control member to the other of its said positions upon removal of said force, and means responsive to shifting of said second control member to its said one position to release said releasable means.

36. Magnetic recording equipment comprising a recording-reproducing head, controllable mechanism for translating a magnetic record relative to said head, a first control member operative in a first position to condition the equipment for recording and operative in a second position to condition the equipment for reproducing, a second control member for starting and stopping said mechanism, shiftable from a stop position to a start position responsive to the application of a shifting force, resilient means operative to restore said second control member to the stop position on removal of said force, and means interconnecting said second and first control members providing for shifting of said first control member to the reproduce position when said second control member is shifted to the start position.

37. Magnetic recording equipment comprising a recording-reproducing head, controllable mechanism for translating a magnetic record relative to said head, a switch for alternatively conditioning the equipment for recording and reproducing, biased to reproducing condition, a control member manually shiftable to a predetermined position to move said switch to recording condition, latch-engaging means moved by said control member when the same is shifted to said predetermined position, a latch permanently biased to be engaged by said latch-engaging means upon said movement thereof, for retaining the switch in recording condition, and a manually actuable device, operatively coupled to both said mechanism and said latch, for controlling the operation of said mechanism and moving said latch against its bias whereby to disengage said latch-engaging means therefrom and to release the switch for response to its bias.

38. Magnetic recording, reproducing, and erasing apparatus comprising magnetic recording, reproducing, and erasing head means, a carriage for said head means mounted for forward scanning movement and backspacing movement relative to a record, automatic means controlled by the carriage in back-spacing movement for conditioning the head means for reproducing and for disabling the head means for erasing, and manual means for conditioning the head means for erasing, operable when the carriage is in a position back-spaced from a recorded portion of the record, to provide for erasing of that record portion during a subsequent forward scanning movement.

39. Magnetic recording, reproducing, and re-recording apparatus comprising a magnetic recording-reproducing transducer, a transducer carriage mounted for forward scanning movement and backspacing movement relative to a record, automatic means controlled by the carriage in back-spacing movement for conditioning the transducer for reproducing to provide for reproduction of a record during a forward scanning movement of the carriage following a back-spacing movement, and manual means for conditioning the transducer for recording, operable when the transducer is in a position back-spaced from a recorded portion of the record, to provide for re-recording of that record portion during a forward scanning movement of the carriage.

40. Apparatus in accordance with claim 39 in which said manual means comprises a switch alternatively shiftable to recording and reproducing positions, and biased to reproducing position, and further including a latch for maintaining said switch in recording position against said bias, and in which said automatic means is controlled by the carriage in back-spacing movement to render said latch ineffective to maintain said switch in record position, whereby to provide for automatic shift of said switch to reproducing position.

41. Apparatus in accordance with claim 40 and further including means for restoring said latch to effective condition when the apparatus is conditioned for reproducing, whereby to permit latching of said switch upon manual shift thereof to recording position after automatic shift thereof to reproduce position.

42. Office dictation equipment comprising a record support, a record cooperable transducer, a carriage for said transducer mounted for normal advancing movement and for back-spacing movement relative to a record on said support, means for alternatively conditioning said transducer for recording and reproducing, electrically controllable means for shifting said conditioning means only from recording to reproducing, a switch for controlling said shifting means normally positioned for conditioning of said equipment for recording, means controlled by said carriage in response to back-spacing thereof to operate said switch to cause said equipment to be conditioned for reproducing, and means responsive to said conditioning of said equipment for reproducing to restore said switch to normal position.

43. Office dictation equipment comprising a record support, a record cooperable transducer, a carriage for said transducer mounted for normal advancing movement and for back-spacing movement relative to a record on said support, a control switch for said equipment operable from one position into a second position, means controlled by said carriage in response to shifting movement thereof along said record to operate said switch into its second position, a control device for said equipment operated in response to operation of said switch to said second position, and means responsive to operation of said control device for restoring said switch to said one position.

References Cited in the file of this patent

UNITED STATES PATENTS

| | | |
|---|---|---|
| 1,075,496 | Robinson | Oct. 14, 1913 |
| 1,139,947 | Zaiss | May 18, 1915 |
| 1,768,200 | Hoffman | June 24, 1930 |
| 2,043,884 | Crudo | June 9, 1936 |
| 2,053,760 | Bedeschi | Sept. 8, 1936 |
| 2,069,841 | Massonneau | Feb. 9, 1937 |
| 2,085,887 | Atkinson | July 6, 1937 |
| 2,086,130 | Hickman | July 6, 1937 |
| 2,113,156 | Langley et al. | Apr. 5, 1938 |
| 2,127,593 | Gramann | Aug. 23, 1938 |
| 2,191,045 | Slayton | Feb. 20, 1940 |
| 2,203,096 | La Forest | June 4, 1940 |
| 2,228,759 | Dunning | Jan. 14, 1941 |
| 2,229,293 | Huntley | Jan. 21, 1941 |
| 2,251,603 | Schiff | Aug. 5, 1941 |
| 2,257,439 | Wilson | Sept. 30, 1941 |
| 2,277,207 | Chenoweth | Mar. 24, 1942 |
| 2,280,575 | Fritzinger | Apr. 21, 1942 |
| 2,284,836 | Norton et al. | June 2, 1942 |
| 2,288,082 | Gailmard et al. | June 30, 1942 |
| 2,320,572 | Dann | June 1, 1943 |
| 2,431,360 | Philpott | Nov. 25, 1947 |
| 2,440,034 | Wiegers | Apr. 20, 1948 |
| 2,530,029 | Pond | Nov. 14, 1950 |
| 2,540,299 | Shoop | Feb. 6, 1951 |
| 2,581,499 | Roberts | Jan. 8, 1952 |
| 2,613,939 | Moore | Oct. 14, 1952 |

FOREIGN PATENTS

| | | |
|---|---|---|
| 314,680 | Great Britain | July 4, 1929 |